United States Patent [19]
Zimmerer et al.

[11] 3,785,400
[45] Jan. 15, 1974

[54] ALIGNMENT MONITORING SYSTEM FOR A SELF-PROPELLED IRRIGATION SYSTEM

[75] Inventors: Arthur L. Zimmerer, Lindsay; John L. Anderson, Columbus, both of Nebr.

[73] Assignee: Lindsay Manufacturing Co., Lindsay, Nebr.

[22] Filed: July 27, 1972

[21] Appl. No.: 275,713

[52] U.S. Cl. .................................. 137/344, 239/212
[51] Int. Cl. ............................ B05b 9/02, E01h 3/02
[58] Field of Search ................... 137/344; 239/212, 239/213

[56] References Cited
UNITED STATES PATENTS

| | | | |
|---|---|---|---|
| 3,386,661 | 6/1968 | Olson et al. | 137/344 X |
| 3,417,766 | 12/1968 | Purtell | 137/344 X |
| 3,465,766 | 9/1969 | Siebert | 137/344 X |
| 3,606,160 | 9/1971 | Bonds et al. | 137/344 X |
| 3,623,663 | 11/1971 | Koinzan | 137/344 X |
| 3,628,769 | 12/1971 | Thomas | 137/344 X |
| 3,653,400 | 4/1972 | Coates | 137/344 |
| 3,692,045 | 9/1972 | Carr | 137/344 |
| 3,707,164 | 12/1972 | Clemons | 137/344 |
| 3,498,314 | 3/1970 | Gheen | 239/212 X |

*Primary Examiner*—Samuel Scott
*Attorney*—Zarley, McKee & Thomte

[57] ABSTRACT

An alignment monitoring system for a self-propelled irrigation system of the center pivot type is disclosed herein. The alignment monitoring system is operatively electrically connected to the electrical control circuit which deactivates the electrical power means on all of the towers if one of the towers moves out of alignment with respect to the other towers in a predetermined amount. Each of the towers has a safety switch thereon which causes the entire electrical circuit to be de-energized if the safety switch is opened by misalignment of the associated tower. Each of the safety switches has a resistor connected thereto which is connected to ground. All of the resistors have progressively increasing resistances with respect to each other. If one of the tower safety switches is opened by misalignment of the associated tower, the operator switches a milliampmeter into the resistor circuit to determine which of the particular towers cause the control system shut down.

7 Claims, 4 Drawing Figures

PATENTED JAN 15 1974  3,785,400

ALIGNMENT MONITORING SYSTEM FOR A SELF-PROPELLED IRRIGATION SYSTEM

A center pivot irrigation machine or system is an electrically driven or controlled machine used primarily to transport and distribute water for agricultural purposes. The machines vary in length but are generally about one-eighth to one-half mile with independently driven motors on support towers based every one hundred to two hundred feet depending on the model and type of machine. The center pivot irrigation machines operate on all types of terrain. Conventional center pivot irrigation systems employ an alignment means so that the water distribution pipe is maintained in a substantial aligned condition as the support towers propel the pipe around the center pivot. An electrical control circuit is provided to deactivate the entire electrical system if one of the towers should become seriously misaligned so as to prevent structural damage to the system. It is then necessary for the operator to go to each of the towers in an effort to determine if that particular tower caused the electrical control system shut down. If the system is a long system with 20 towers, such a procedure is time consuming.

Therefore, it is a principal object of this invention to provide an alignment monitoring system for a self-propelled irrigation system.

A further object of this invention is to provide an alignment monitoring system for a self-propelled irrigation system of the center pivot type.

A further object of this invention is to provide an alignment monitoring system for a self-propelled irrigation system employing a milliampmeter or ampmeter which provides a direct read out of the tower causing the electrical control system shut down.

A further object of this invention is to provide an alignment monitoring system for a self-propelled irrigation system which is convenient to use.

A further object of this invention is to provide an alignment monitoring system for a self-propelled irrigation system which does not require substantial additional electrical circuitry for the system.

A further object of this invention is to provide an alignment monitoring system for a self-propelled irrigation system which is economical of manufacture and trouble free.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

Figure 1:
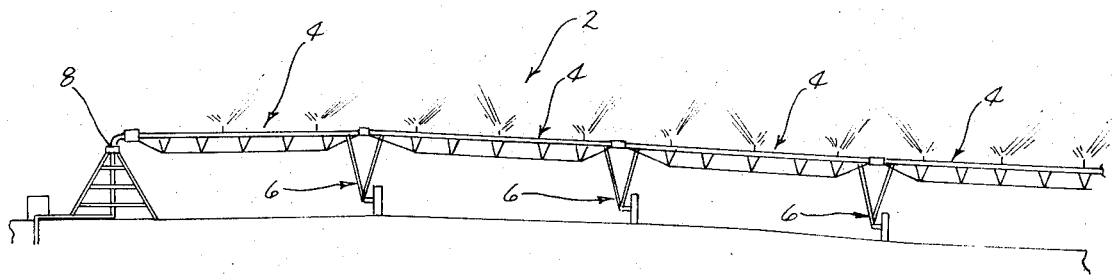
FIG. 1 is a side view of a conventional center pivot irrigation system.

The numeral 2 generally refers to a conventional self-propelled irrigation system of the center pivot type generally comprising a water distribution pipe 4 supported by a plurality of spaced apart support towers 6. The towers 6 drive the pipe 4 around the center pivot 8. Each of the towers 6 generally include an electrical gear motor or the like for propelling the towers over the terrain. The motors on the towers are electrically connected to a conventional source of alternating current in conventional fashion.

The conventional source of alternating current is referred to generally by the reference numeral 10 connected to fuse 12 by lead 14. Fuse 12 is connected to a double pole, double throw switch 16 including a push button 18. For purposes of description, switch 16 will be described as including contacts 20, 22, 24 and 26; terminals 28, 30, 32 and 34; and, switch arms 36 and 38.

Lead 40 electrically connects fuse 12 to terminal 32 while lead 42 connects terminals 32 and 28. Lead 44 connects terminal 34 with a rectifier 46 which converts the alternating current to direct current in conventional fashion. A resistor 48 is connected to rectifier 46 by lead 50 and is connected to a milliampmeter 52 by lead 54. Milliampmeter 52 is electrically connected to terminal 30 by lead 56. Milliampmeter 52 is provided with a graduated scale 58 having numbers thereon corresponding to the number of towers in the system. For example, if the water distribution pipe 4 is driven by 20 towers, the milliampmeter 52 would be provided with twenty gradations thereon.

The numerals 60 refer generally to a plurality of normally closed, tower safety switches which are series connected. The safety switch 60 on tower number 1 is electrically connected to the terminal 30 by lead 62. Each of the safety switches 60 are provided with a switch arm 64 which normally electrically connects the common terminal 66 with the normally closed contact 68. The numeral 70 refers to a contact in the safety switch 60 which is engaged by the switch arm 64 if the safety switch 60 is opened by the misalignment of the associated tower. The contact 70 is electrically connected to a resistor 72 by lead 74. Resistor 72 is connected to ground 76 by lead 78.

The resistors 72 connected to each of the tower safety switches 60 have different resistance values and would be pre-set at the factory. In other words, the resistor 72 at tower number 1 would have a different resistance value than the resistor 72 at tower number 2. Likewise, the resistor 72 at tower number 1 would have a resistance value corresponding to the numeral 1 on the milliampmeter 52.

Figure 3:
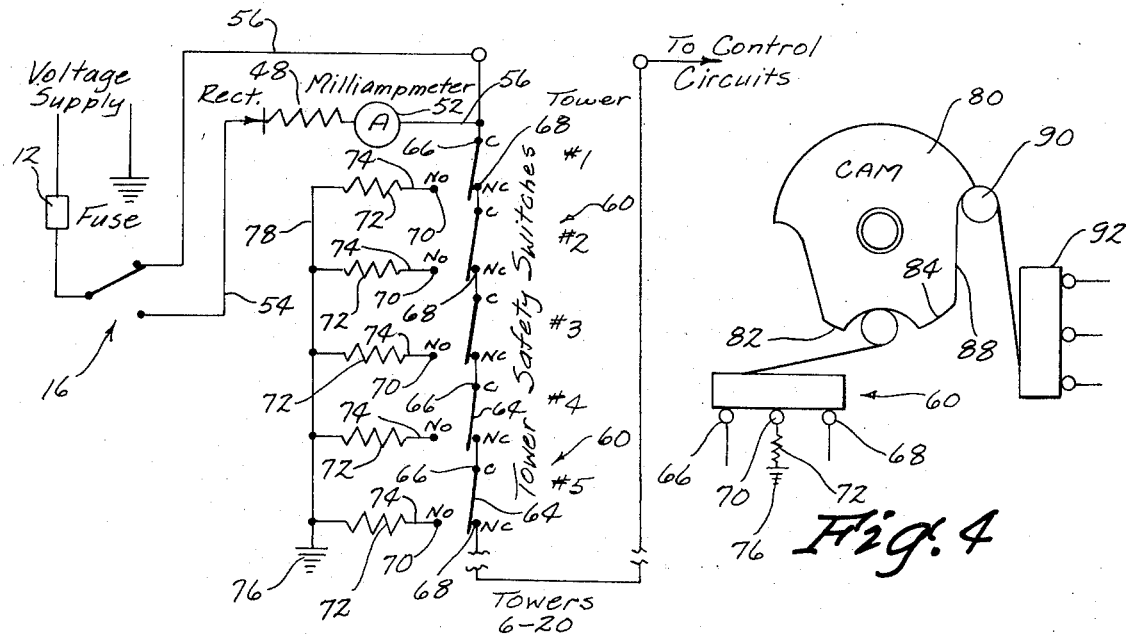
FIG. 3 is a further schematic illustration of the electrical circuitry of the monitoring system of this invention.
Figure 4:
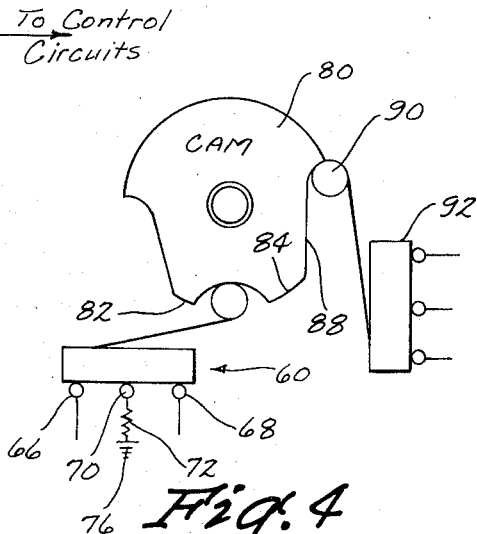
FIG. 4 is a schematic illustration of the relationship between the tower safety switch, cam actuator and control switch.

The safety switches 60 are series connected to the conventional control circuit or circuits of the system as illustrated in FIG. 3. In other words, if all of the tower safety switches 60 are in their normally closed position, the control circuit will function to supply electrical power to the electrical motors on each of the towers 6. A conventional alignment means is provided on each of the towers to slow down or speed up the tower depending upon its particular relationship with respect to the adjacent towers. The alignment means includes a cam 80 shown generally in FIG. 4. Cam 80 includes a pair of spaced apart lobes 82 and 84 which are adapted to engage the safety switch actuator 86 to open the safety switch 60 if the associated tower moves out of alignment to a predetermined amount with respect to the adjacent towers. Cam 80 is also provided with the cam surface 88 which is adapted to engage the control switch actuator 90. Actuator 90 controls the control switch 92 which operates the electrical motor on the tower.

In normal operation, the current flows from the voltage supply 10 through the fuse 12 to terminal 32 (connected to contact 24). The current goes from terminal 32 to the contact 20 through the lead 42 and terminal 28. Switch arm 36 electrically connects the contacts 20 and 22 so that the current flows to the tower safety switches 60. Current does not flow through the milliampmeter 52 at this time since the contacts 24 and 26 are not electrically connected by the switch arm 38. The current flows through the tower safety switches 60 to the system control circuit so that the electric motors on the various support towers 60 are operated in conventional fashion.

Figure 2:
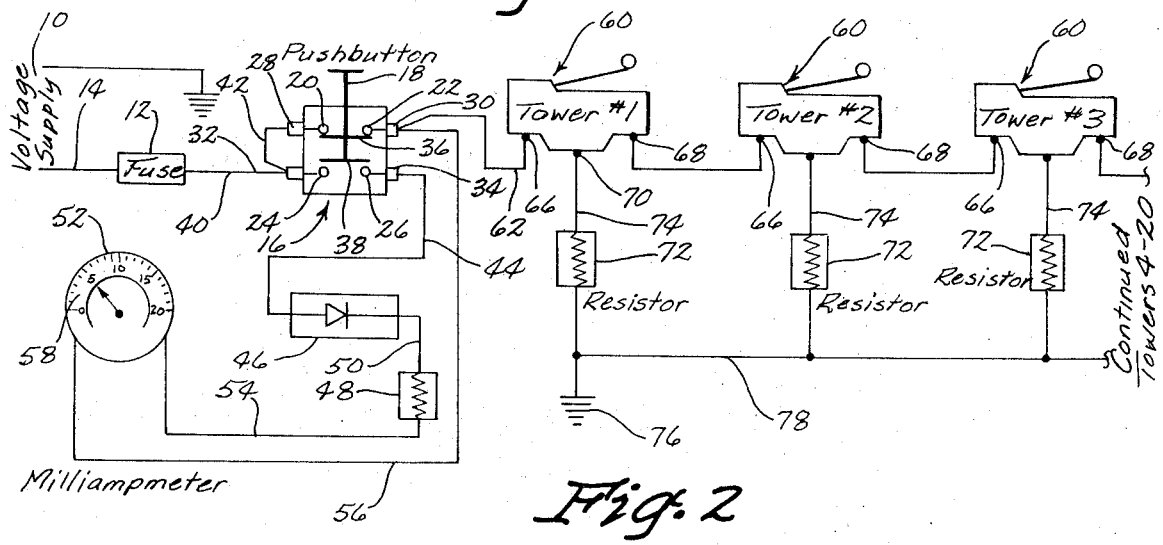
FIG. 2 is a schematic illustration of the electrical circuitry of the monitoring system of this invention.

If a malfunction occurs during the operation of the system, one of the tower safety switches 60 would switch from its normally closed contact 68 to the normally open contact 70 thereby interrupting the flow of current to the control circuit which would cause the entire electrical system to be shut down or de-energized. The problem then arising is to ascertain which of the towers malfunctioned or moved out of substantial alignment so as to de-activate the entire electrical system. The operator then manually switches the switch 16 so that the switch arm 38 electrically connects contacts 24 and 26. Current then flows through the switch 16 to the rectifier 46 which converts the power to direct current, then through the resistor 48, then through the milliampmeter 52. The current then passes through the lead 56 to the terminal 30. The current flows out through the tower safety switches 60 until it reaches that tower switch 60 which had switched to the normally open contact or position. The current then flows through the resistor 72 to ground. Since each of the resistors 72 have a different resistance value and are coordinated to the scale on the milliampmeter 52, the milliampmeter 58 indicates that tower which caused the control circuit to de-energize. In FIG. 2, the milliampmeter 52 indicates that tower number 5 was the tower that caused the system shut down. The operator simply goes directly to tower number 5 to correct the situation which caused the malfunction.

Thus it can be seen that an extremely effective alignment monitoring system has been provided for a self-propelled irrigation system which permits the operator to quickly and easily determine which of the support towers caused the control circuit to be deactivated. The monitoring system of this invention does not require substantial electrical circuitry to be added to the system but merely requires that preset resistors be electrically connected between ground and the tower safety switches and the milliampmeter be electrically connected to the switch 16. Thus it can be seen that the invention accomplishes at least all of its stated objectives.

We claim:

1. In combination,
   an elongated water distribution pipe,
   a plurality of self-propelled support towers along the length of said pipe for propelling said pipe, each of said towers having power means thereon for propelling said towers,
   an electrical control circuit operatively connected to said power means for deactivating the power means on all of said towers upon one of said towers moving out of alignment with respect to the other towers in a predetermined amount,
   and an alignment monitoring system operatively electrically connected to said towers for determining which of the towers caused the control circuit to deactivate the power means.

2. The combination of claim 1 wherein a normally closed safety switch is provided on each of said towers, said safety switches being electrically series connected to a source of electrical current and said electrical control circuit.

3. The combination of claim 2 wherein said alignment monitoring system comprises a resistor of predetermined resistance electrically connected to each of said safety switches and ground, and a meter means operatively selectively electrically connected to said safety switches.

4. The combination of claim 3 wherein said meter means is a direct current milliampmeter.

5. The combination of claim 3 wherein the resistor connected to each of said safety switches is not energized until the safety switch connected thereto is moved from its normally closed position to an open position.

6. The combination of claim 5 wherein said meter means has a scale thereon corresponding to each of the resistors on said safety switches.

7. The combination of claim 7 wherein a switch means electrically connects the source of electrical power and said meter means to permit selective operation of said meter means.

* * * * *